United States Patent
De Laforcade

(10) Patent No.: US 6,431,408 B1
(45) Date of Patent: Aug. 13, 2002

(54) DISPENSING DEVICE AND METHODS

(75) Inventor: Vincent De Laforcade, Rambouillet (FR)

(73) Assignee: L'Oreal S.A., Paris (FR)

( * ) Notice: Subject to any disclaimer, the term of this patent is extended or adjusted under 35 U.S.C. 154(b) by 0 days.

(21) Appl. No.: 09/992,429

(22) Filed: Nov. 26, 2001

(30) Foreign Application Priority Data

Nov. 24, 2000 (FR) .......................... 00 15222

(51) Int. Cl.⁷ .............................................. G01F 11/42
(52) U.S. Cl. .................... 222/328; 222/321.5; 222/377
(58) Field of Search .......................... 222/321.5, 321.7, 222/321.9, 328, 377, 401.2, 454, 456

(56) References Cited

U.S. PATENT DOCUMENTS

| 1,896,405 A | | 2/1933 | Hauser | |
|---|---|---|---|---|
| 3,029,001 A | * | 4/1962 | Blish | 222/328 |
| 4,159,791 A | * | 7/1979 | Crutcher | 222/454 |
| 4,324,349 A | * | 4/1982 | Kaufman | 222/328 |
| 5,259,536 A | * | 11/1993 | Reyman | 222/454 |
| 5,476,198 A | | 12/1995 | Jouillat et al. | |

FOREIGN PATENT DOCUMENTS

| EP | 0 626 321 | 11/1994 |
|---|---|---|
| FR | 2 393 279 | 12/1978 |

OTHER PUBLICATIONS

Co-pending Application No. 09/902,592; Attorney Docket No. 05725.0925–00000 Title: Retention Element, Dispensing Device, and Method of Use Inventor(s): Frank Lacout U.S. Filing Date: Jul. 12, 2001.

English language Derwent Abstract of FR 2 393 279, Dec. 29, 1978.

* cited by examiner

Primary Examiner—William C. Doerrler
Assistant Examiner—Thach H. Sui
(74) Attorney, Agent, or Firm—Finnegan, Henderson, Farabow, Garrett & Dunner, LLP

(57) ABSTRACT

A device for dispensing a product may comprise a container defining an opening, with the container being configured to contain a product and a retaining element mounted at least partially in the opening and defining a cavity configured to contain an amount of the product for dispensing. The device may further comprise a separating member separating a first region of the container from a second region of the container. The first region may be configured so that the product resides therein when the device is in an upright position and the second region may be disposed adjacent the opening. At least one first passage defined by the retaining element may have a position that defines a maximum amount of product capable of being contained in the cavity. At least one second passage defined by the retaining element may be in flow communication with the second region of the container and configured to permit passage of at least some product from the second region into the cavity. The separating member may be configured to permit one-way flow of product from the first region to the second region when the device is at least partially inverted from its upright position.

82 Claims, 5 Drawing Sheets

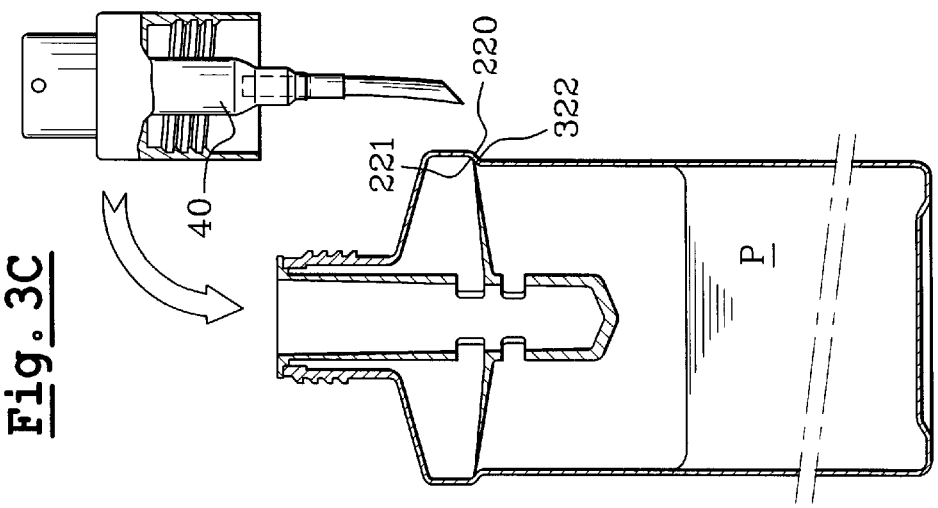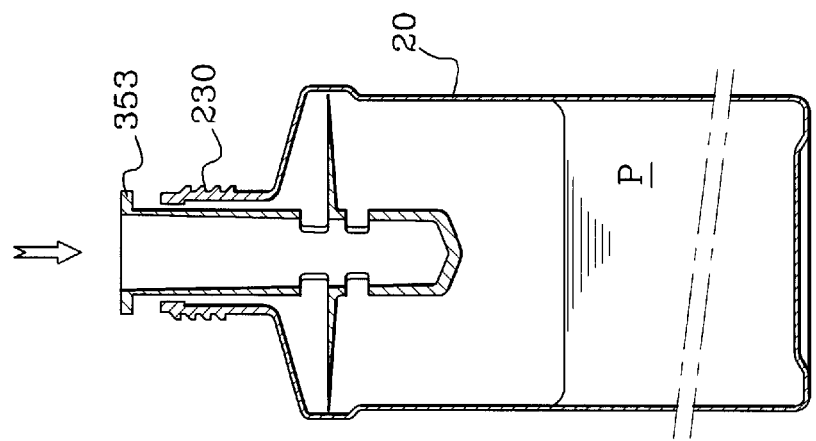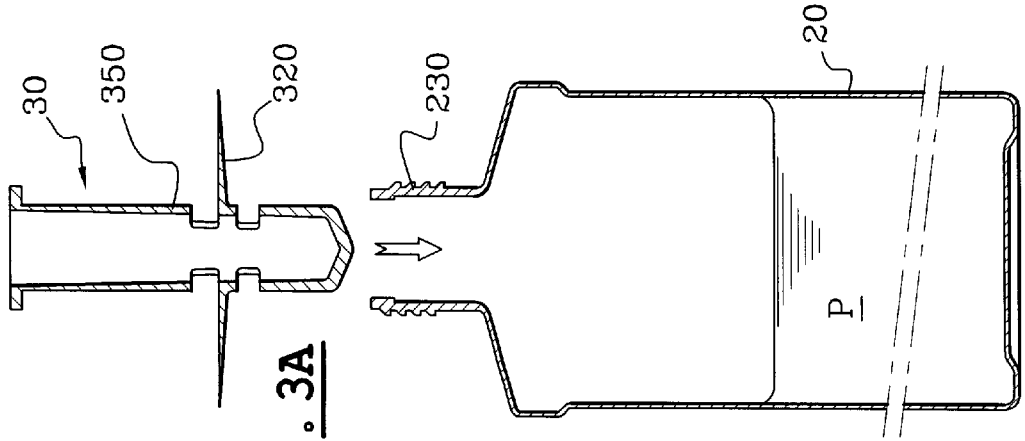

DISPENSING DEVICE AND METHODS

The present invention relates to a device for dispensing of a product, such as a cosmetic or care product, for example. In particular, the device may be useful for the metered dispensing of a product, for example, for makeup, care, and/or cleaning of the skin, hair, fingernails, and/or toenails. Such metered dispensing may be especially desirable when using products for hair care or for hair regrowth, for example.

Existing devices for dispensing may comprise a retaining member delimiting a metering cavity configured to be filled, for example, by completely or partly inverting the device. The dispensing of the product may be by means of a pump that typically is actuated while the device is in the head-up position. The device may be, for example, equipped with a pump for dispensing the product contained in the metering cavity, with the dispensing being performed with the pump situated above the free surface of the liquid in the container containing the product that is to be dispensed.

EP 0 626 321 discloses an assembly equipped with a pump and a retention member comprising a bottom and a side wall. The retention member has an outside diameter that is smaller than the inside diameter of the neck of the container. The retention member also comprises, in one embodiment, flexible tabs that stretch out toward the neck of the container in a direction that makes an angle with the vertical. Spaces between the tabs allow the retention member to become filled with product to be dispensed.

Conventional metered dispensing devices may not permit adequate filling of the retention member, particularly when nearing the end of use of the contents of the device. In such cases, a substantial variation in the degree of filling of the retaining member may be observed. Such variation may be according to the way in which the container is moved from its totally or partly inverted position to its dispensing (i.e., upright) position.

Hence, it may be desirable to provide an assembly for the metered dispensing of a product that solves all or some of the disadvantages of the devices described above. In particular, it may be desirable to provide a device that allows better repeatability of the level of filling of the metering cavity and does so substantially until the last use of the device.

Another desirable aspect is a device in which the degree of filling of the metering cavity may be independent of the action used to fill the metering cavity. Preferably, such devices will be relatively simple and reliable to use and economical to produce.

It should be understood that the invention could be practiced without performing one or more of the preferred objects and/or advantages described above. Other objects of the invention will become apparent from the detailed description which follows.

As embodied and broadly described herein, one aspect of the invention includes a device for dispensing a product, the device comprising a container defining an opening. The container may be configured to contain a product. The device may further comprise a retaining element mounted at least partially in the opening and defining a cavity configured to contain an amount of the product for dispensing. A separating member may separate a first region of the container from a second region of the container. The first region may be configured so that the product resides therein when the device is in an upright position and the second region may be disposed adjacent the opening. The device may further comprise at least one first passage defined by the retaining element, the at least one first passage having a position that defines a maximum amount of product capable of being contained in the cavity. The device also may comprise at least one second passage defined by the retaining element, the at least one second passage being in flow communication with the second region of the container and configured to permit passage of at least some product from the second region into the cavity. The separating member may permit one-way flow of product from the first region to the second region when the device is at least partially inverted from its upright position.

At least one third passage also may be defined between the container and the separation member when the device is at least partially inverted. The third passage may permit the flow of product from the first region to the second region.

The separation member may slope downward in a direction toward the second passage.

The separation member may comprise an elastically deformable diaphragm and may define a peripheral edge that extends substantially to an interior surface portion of the container. The diaphragm may be made of a material chosen from thermoplastic elastomers and crosslinked elastomers. The diaphragm may also be made of a material chosen from silicones, natural lattices, synthetic latices, EPDMs, polyurethanes, blends of polypropylene and SIBS, blends of polypropylene and SEBS, blends of polypropylene and EPDM, very-low-density polyethylenes, blends based on polyester glycols, blends based on polyether glycols, and flexible polyvinyl chlorides.

The separation member may have a thickness that decreases toward the peripheral edge. Such a configuration may make it easier for the separation member to be fitted in the container and also may facilitate the opening and closing (i.e., forming) of the at least one third passage. Moreover, the separation member may be inclined in a downward direction toward the retaining element. For example, the separation member may form an angle ranging from approximately 60 degrees to approximately 90 degrees with a longitudinal axis of the device. This characteristic of the separation member may encourage all or some of the product located in the second region of the container to be conducted toward the metering cavity.

A portion of the separation member may be configured to contact another interior surface portion of the container when the device is in an upright position and may be configured to move away from the other interior surface portion when the device is at least partially inverted. The portion of the separation member may be configured to move away from the other interior surface portion in response to pressure of the product. The portion of the separation member that is configured to come into contact with the other interior surface portion of the container may comprise an annular portion radially separated from the peripheral edge of the separation member. The other interior surface portion may be a shoulder defined by the container. The shoulder may make it possible to maintain the separation member at a desired height in the container. It also may provide a certain amount of sealing between the separation member and the interior surface portion of the container without the need to use a separation member having a peripheral edge that presses with excessive friction against the interior surface portion in order to hold it in place. Such excessive friction may hinder the separation member from easily moving away from the inner surface of the container when the device is placed in the at least partly inverted position.

In an exemplary embodiment, the portion of the separation member configured to come into contact with the interior surface portion of the container may lie at a distance ranging from approximately 0.5 mm to approximately 3 mm away from the peripheral edge, for example. Such a configuration may allow for a substantial sealing, at least to product flow, of the first region from the second region when the device is in the upright position, regardless of the tolerances used during its manufacture.

According to an aspect, the retaining element and the separation member may be molded together as a single piece.

The retaining element may comprise a tubular member having a closed end defining a bottom of the cavity when the device is in an upright position and having an end opposite the closed end being mounted proximate an edge of the opening of the container. The end opposite the closed end may define an opening. A pump associated with a dip tube may be provided, with the dip tube extending to proximate the bottom of the cavity. The presence of the dip tube may make it possible to produce a relatively larger-volume metering cavity.

The container may comprise a neck portion and the retaining element may extend over at least part of its height within the neck portion. According to an aspect, the neck portion may comprise a free edge that defines the opening of the container. The device may further comprise a pump configured to be mounted in the neck portion. A band may be configured to mount the pump in the neck portion, for example, the band may be configured to engage with the neck portion by one of snap-fastening and screw-fastening. There may also be an actuation member for actuating the pump. The actuation member may comprise a push-button, for example.

The separation member may extend radially outward from the retaining element and may be substantially planar. The separation member may be a solid member, for example.

The at least one first passage and the at least one second passage may be disposed on opposite sides of the separation member.

The device may further comprise the product in the container. The product may be chosen from a cosmetic product and a care product. According to an aspect, the product may be for application to at least one of skin, hair, fingernails, and toenails.

In yet another aspect, the invention includes a dispensing head for dispensing product from a container. The dispensing head may comprise a tubular member defining a cavity configured to contain an amount of product to be dispensed. The dispensing head also may comprise a separation member extending radially from the tubular member and being configured to substantially separate a first region of the container from a second region of the container when the dispensing head is associated with the container and the container is in an upright position. The tubular member may define at least one first passage configured to permit flow of product therethrough and at least one second passage configured to permit flow of product therethrough. The at least one first passage and the at least one second passage may be disposed on opposite sides of the separation member.

The tubular member may comprise a closed end defining a bottom of the cavity when the dispensing head is associated with the container and the container is in an upright position. The tubular member may have an edge defining an opening configured to at least partially receive a dispensing mechanism. The dispensing head may further comprise the dispensing mechanism, which may comprise a pump, for example. The dispensing mechanism may further comprise a dip tube that extends to proximate an end of the tubular member opposite the opening. The end of the tubular member opposite the opening may be closed and define a bottom of the cavity when the dispensing head is associated with the container and the container is in an upright position.

The separation member may slope downward in a direction toward the tubular member, and may form an angle ranging from approximately 60 degrees to approximately 90 degrees with a longitudinal axis of the tubular member. The tubular member and the separation member may be molded together as a single piece, which may permit a relatively low-cost manufacture and facilitate the fitting of the structure into the container.

According to an aspect, the separation member may flex so as to permit product flow communication between the first region and the second region of the container when the dispensing head is associated with the container and the container is in an at least partially inverted position. At least the portion of the separation member may be configured to pivot with respect to the tubular member in response to sufficient pressure acting on the separation member.

The dispensing head may further comprise a band configured to engage with a neck portion of the container for mounting the dispensing head on the container. The band may be configured to engage the neck portion via one of snap-fastening and screw-fastening, for example.

An annular region of the separation member may be configured to contact an interior wall surface of the container when the dispensing head is associated with the container and the container is in an upright position. The annular region of the separation member may be radially separated from a peripheral edge of the separation member and may be configured to move out of contact with the interior wall surface of the container when the dispensing head is associated with the container and the container is in an at least partially inverted position.

According to an aspect, the dispensing head may also comprise a third passage defined at least partially by the separation member when the dispensing head is associated with the container and the container is in an at least partially inverted position, the third passage being configured to flow product from the first region to the second region.

Yet another aspect includes an assembly for dispensing a product comprising a container configured to contain a product to be dispensed and a dispensing head such as those described above, for example.

The assembly may further comprise a product in the container. The container may comprise a neck portion and the dispensing head may be mounted at least partially on the neck portion.

The at least one first passage may be in flow communication with the first region and the at least one second passage may be in flow communication with the second region.

Yet another aspect includes a method of dispensing a product comprising providing a dispensing device or assembly, such as those described above, for example, flowing product into the cavity, and dispensing the product from the cavity.

The dispensing of the product from the cavity may comprise dispensing substantially all of the product within the cavity. The flowing of the product into the cavity may comprise flowing the product into the cavity via the second passage. Also, the flowing of the product into the cavity may comprise flowing the product into the cavity via the first passage. Further still, the flowing of the product into the cavity may comprise flowing product from the second region of the container through the second passage.

According to an exemplary embodiment, the flowing of the product into the cavity comprises inverting the device.

According to an aspect, the method may further comprise forming a third passage between the first region and the second region. The method may further comprise flowing the product from the first region into the second region via the third passage.

In another exemplary embodiment, the method may further comprise flowing excess product out of the cavity via the first passage prior to dispensing the product from the cavity.

According to an exemplary embodiment, the first region of the container may be below the separation member and the second region of the container may be above the separation member when the container is in an upright position.

In an exemplary embodiment, the device and method for dispensing may be particularly well suited to the packaging and dispensing of a cosmetic or care product, particularly for the skin or for the hair, for example. The product may be a root nutrient or a scalp care product, for example.

As used herein, the expression "one-way flow . . . when the device is at least partially inverted from its upright position" may be understood as meaning a flow in which the rate is greater when the device is at least partly inverted than when the device is returned to an upright position (e.g., when the device is upright the separating member could either prevent flow of product from the first region to the second region or this flow could be at a reduced rate as compared to when the device is at least partially inverted). For example, the cross-section of the at least one third passage may be greater when the device is at least partly inverted than it is when the device is in the upright position. Alternatively, there might not be a third passage when the device is upright, for example.

The separation member may be designed so as to be open under the pressure of the product when the device is inverted and to close in a practically sealed manner when the device is returned to the upright position. In other words, the separating member may partially define the at least one third passage and substantially prevent the return of the product which is flowed via the at least one third passage into the second region when the device is inverted. This may be regardless of the action involved in inverting the device and, in particular, of the speed at which the inverting movement is performed.

The term "providing" used herein is used broadly and may refer to, but is not limited to, making available for use, giving, supplying, obtaining, getting a hold of, acquiring, purchasing, selling, distributing, possessing, making ready for use, and/or placing in a position ready for use.

Aside from the structural and procedural arrangements set forth above, the invention could include a number of other arrangements, such as those explained hereinafter. It is to be understood that both the foregoing description and the following description are exemplary. The accompanying drawings are included to provide a further understanding of the invention and are incorporated in and constitute a part of this specification. The drawings illustrate exemplary embodiments of the invention and, together with the description, serve to explain certain principles. In the drawings, FIG. 1A is a sectional view of a device according to an exemplary embodiment of the invention;

FIG. 3A is a sectional view showing the element of FIG. 2 prior to insertion in the container of FIG. 1A;

FIG. 3B is a sectional view showing the fitting of the element of FIG. 2 into the container of FIG. 1A;

FIG. 3C is a sectional view showing a dispensing mechanism associated with the element 30 and container of FIG. 1A;

Reference will now be made in detail to exemplary embodiments of the invention, examples of which are illustrated in the accompanying drawings. Wherever possible, the same reference numbers are used in the drawings and the description to refer to the same or like parts.

Figure 1:
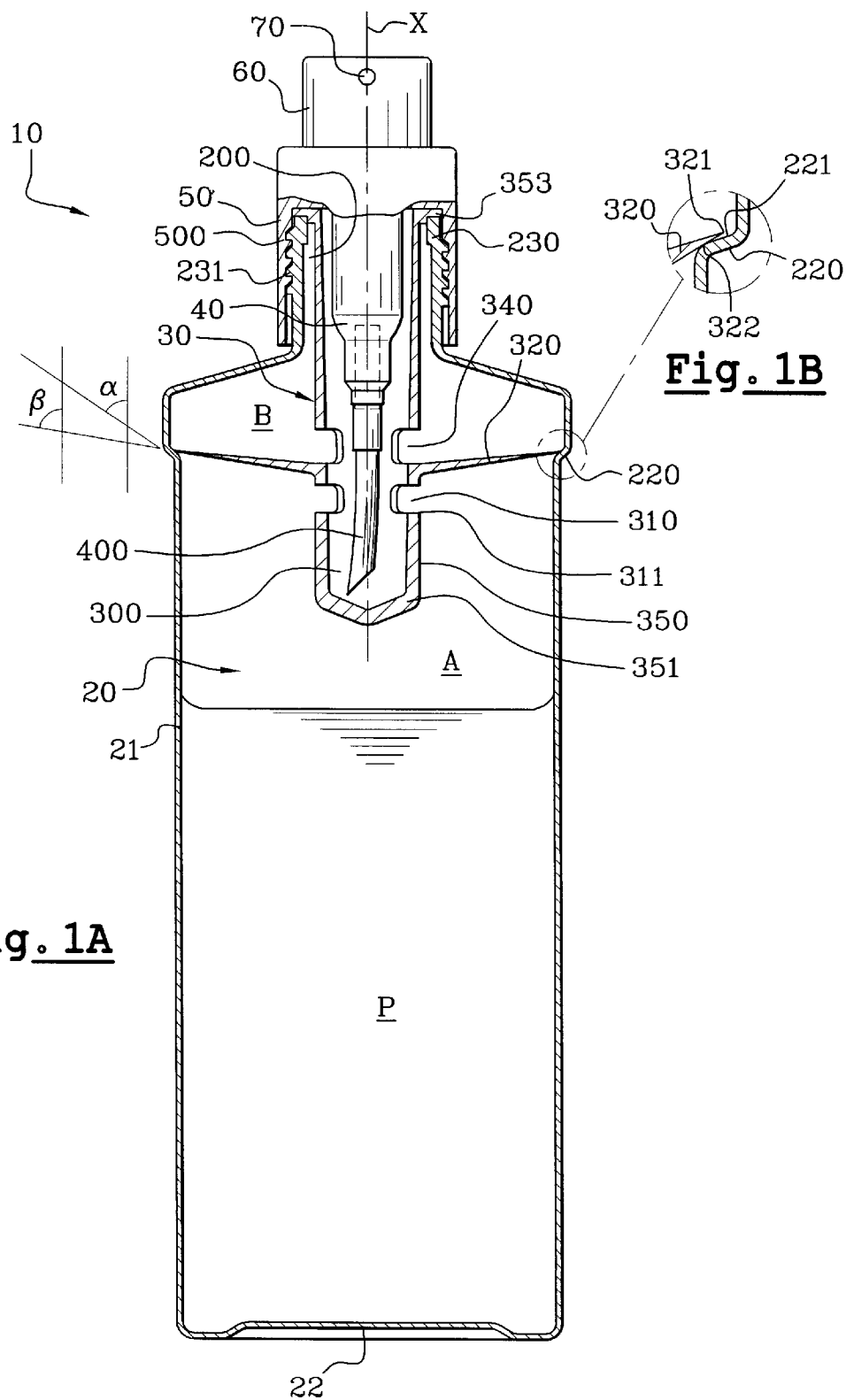
FIG. 1B is a close-up view of the zone surrounded by the dotted line in FIG. 1A.

The device 10 depicted in FIG. 1A comprises a container 20 configured to hold a product P. The container 20 comprises a body 21 having one end closed by a bottom 22. An end opposite to the bottom 22 has a neck portion 230. A free edge of the neck portion 230 defines an opening 200. A retaining element 30 may be mounted at least partly within the opening 200. The exterior surface of the neck portion 230 may have screw threading 231 designed to engage with screw threading 500 disposed on the interior surface of a mounting band 50. The retaining element 30 delimits a metering cavity 300, the content of which is intended to be dispensed when the device is in an upright position. The contents can be dispensed by a variety of means that allow for dispensing in an upright position. Such means are known to those skilled in the art.

As an example, a pump 40 may be provided for dispensing the product P from the metering cavity 300. The pump 40 may be associated with the retaining element 30, as will be described in detail later. The pump 40 may be fixed to the container 20 via the mounting band 50. An actuation mechanism in the form of a push-button 60, for example, may allow the pump 40 to be actuated so as to expel the product P through at least one outlet orifice 70. The constituent elements of the device, such as, for example, the container 20, the retaining element 30, the pump 40, the band 50, and the push-button 60 may be obtained by molding a thermoplastic, such as a polypropylene or a polvethvlene, for example.

Figure 2:
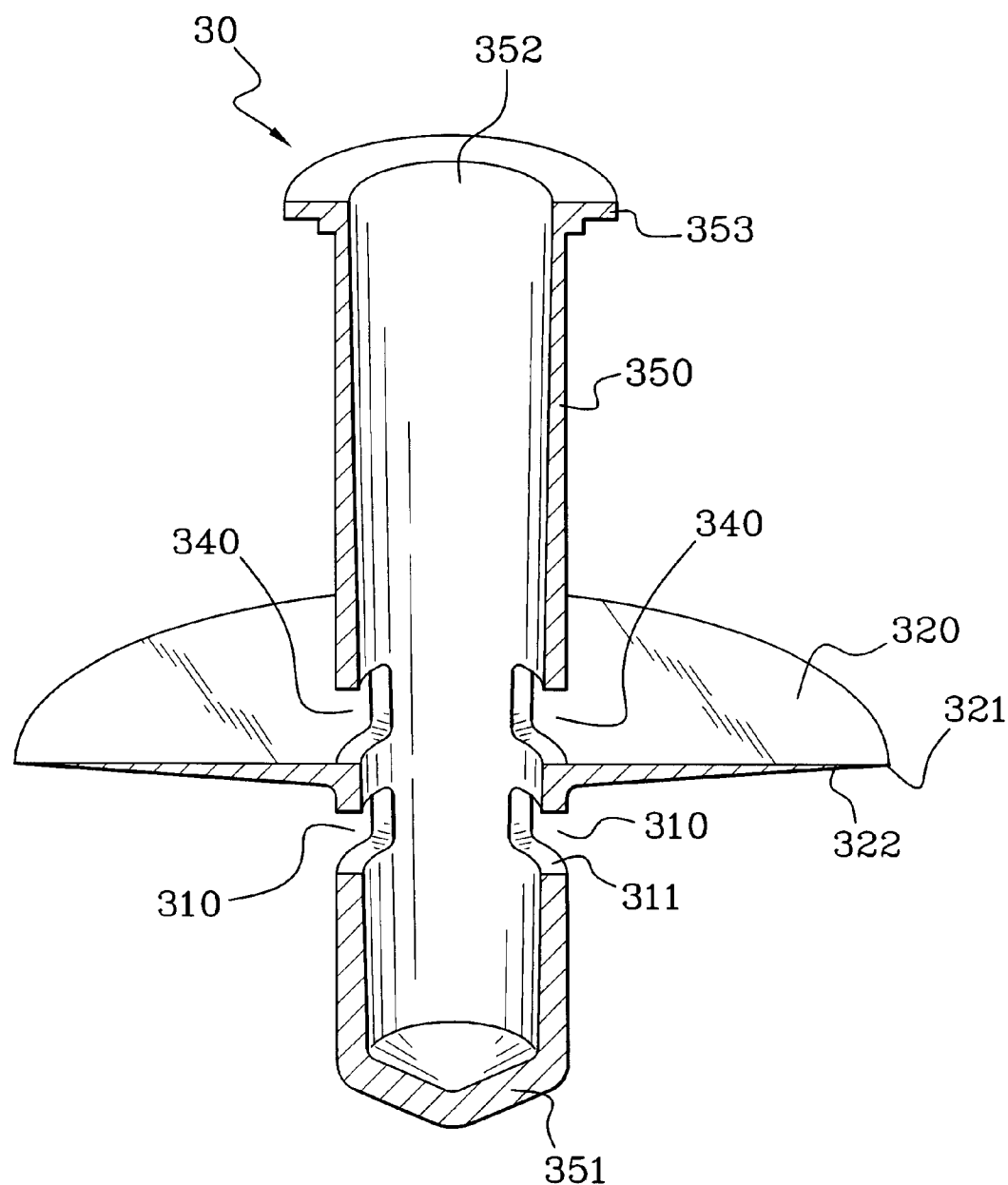
FIG. 2 is a sectional view of element 30 from the device of FIG. 1A.

The retaining element 30 is shown in isolation in FIG. 2. The retaining element 30 may be placed inside the device 10, as shown in FIG. 1A. The retaining element 30 may comprise a tubular element 350, having an outside diameter slightly smaller than the inside diameter of the neck 230 of the container 20. One end of the retaining element 30 may be closed by a bottom 351 thus forming the bottom of the metering cavity 300. The other end 352 is open, and may have a rim 353 that abuts against the free edge of the neck 230 of the container 20. Although the tubular element 350 shown has a substantially circular cross-section, it should be understood that hollow, tubular elements having cross-sections other than circular, such as elliptical, square, rectangular, and triangular, for example, also could be used and are intended to be encompassed within the scope of the invention.

The retaining element 30 may define two substantially diametrically opposed passages 310. The passages 310 may have a substantially oblong shape and may be oriented substantially longitudinally to an axis X of the device 10.

The lower edge 311 of the passages 310 may delimit the maximum filling height of the metering cavity 300 formed below the passages 310. According to an exemplary embodiment, the volume of the metering cavity may be on the order of several milliliters, for example.

A separation member 320, which may be in the form of a diaphragm, for example, may be associated with the retaining element 30, as can be seen in FIG. 1A. The separation member 320 may substantially separate a first region A of the container 20, in which the product P resides when the device 10 is in the upright position, from a second region B disposed adjacent to the opening 200 of the container 20. The separation member 320 may be capable of delimiting, in combination with the interior wall 210 of the container, an annular passage 330 depicted in FIG. 4A, between the first and second zones. The separation member 320 may be configured in such a way as to allow one-way flow of the product towards the second region B in response to an at least partial inversion of the device, allowing the product P to flow through an annular passage 330 formed between the separation member 320 and the inner surface of the container 20.

On the opposite side of the separation member 320 to the passages 310, the retaining element 30 may define two substantially diametrically opposed passages 340. These passages 340 may be offset by approximately 90°, for example, with respect to the passages 310. The passages 340 may have a substantially oblong shape and may be oriented substantially perpendicular to the axis X of the device 10.

The passages 310 may be formed in the tubular element so as to be disposed in the first region A. The passages 340 may be disposed in the second region B. The separation member 320 therefore may separate the passages 310 from the passages 340.

According to an exemplary embodiment, the separation member 320 may be substantially in the form of an elastically deformable diaphragm. A peripheral edge 321 of the diaphragm extends up close to the interior wall 210 of the container, as can be seen in FIG. 1B. The diaphragm may comprise an annular portion 322 capable of coming into contact, for example substantially sealed contact, with a shoulder defined by the wall 210 of the container 20 when the device is in the upright position. The term "substantially sealed" used herein means that most of the product which has entered the second region is substantially prevented from flowing back into the first region when the device is returned to the upright position. Under the pressure of the product in response to the at least partial inversion of the device, the diaphragm may move away from the inner surface portion, i.e., the shoulder 220 of the container 20 so as to define, with the inner surface portion of the wall 210, a passage 330 (FIG. 4D).

The diaphragm may be made of an elastically deformable material chosen, for example, from thermoplastic or crosslinked elastomers. By way of example, particular mention may be made of silicones, natural or synthetic latices, EPDMs, polyurethanes, blends of polypropylene and SBS, SEBS or EPIDM, very-low-density polyethylenes, blends based on polyester glycols (TPU) or polyether glycols (PEBA and COPE), and flexible polyvinyl chlorides (PVCs). Such a material may have a hardness ranging from approximately 20 Shore A to approximately 40 Shore D. In an exemplary embodiment, the hardness may range from approximately 40 Shore A to approximately 75 Shore A. The material's elasticity may range from approximately 0.5 MPa to approximately 5 Mpa (tensile stress at 100% elongation). In an exemplary embodiment, the elasticity may range from approximately 0.8 MPa to approximately 2 Mpa (tensile stress at 100% elongation). As an example, the diaphragm may be made of a silicon elastomer.

The diaphragm 320 also may be inclined toward the metering cavity 300. The diaphragm 320 thus may form an angle β with a longitudinal axis of the device, which may be equal to about 85°, for example. This inclination helps to conduct product that has entered the second region B toward the metering cavity 300.

In order for substantially all of the product P that enters the second region B to be conducted toward the metering cavity 300, diaphragm 320 may form a substantially continuous annular ring substantially without interruption. That is, the diaphragm 320 may be a substantially solid member.

The interior surface of the wall 210 of the container may form a shoulder 220 designed to accommodate the portion 322 of the diaphragm when the device 10 is in the upright position. The upper internal surface 221 of the shoulder may make an angle α with the longitudinal axis of the container equal, for example, to about 60°. This may accommodate the portion 322 of the diaphragm 320 and keep it inclined.

To facilitate the fitting of retaining element 30 into the device 10, as illustrated in FIG. 3, the diaphragm 320 may have a thickness that decreases in a radical direction toward the wall 220 of the container 10.

According to another aspect, the separation member 320 may be provided with at least one valve (not shown) that is capable of opening under a pressure exerted by the product in response to at least a partial inversion of the device. The valve may close when the device is returned to an upright position. Those skilled in the art would understand how such a valve may be formed.

With reference to FIGS. 3A–3C, various steps in assembling the device may be seen. The retaining element 30, as depicted in FIG. 3A may be obtained by molding and may be formed with the separation member 320 as a single piece. The separation member 320 may be is molded at an angle of approximately 90° with respect to the tubular element 350. The diaphragm may be molded at other angles to the retaining element 30. However, the diaphragm should slope downward toward the metering cavity 300.

Once the container 20 has been filled with the product P, the retaining element 30 and the separation member 320 may be inserted through the opening 200 of the container 20 via the neck portion 230, as depicted in FIG. 3B. The retaining element 30 and separation member 320 may be inserted until, as depicted in FIG. 3C, the rim 353 abuts against the neck portion 230 of the container 20. The inclination of the separation member 320 toward the metering cavity 300 may be obtained as a result of the portion 322 of the separation member 320 pressing against the upper interior surface portion 221 of the shoulder 220, which may be inclined by approximately 60°, for example. Once the retaining element 30 and the separation member 320 are fitted within the container 20, the pump 40 may then be positioned inside the container 20, as shown in FIG. 3C.

Figure 4A:
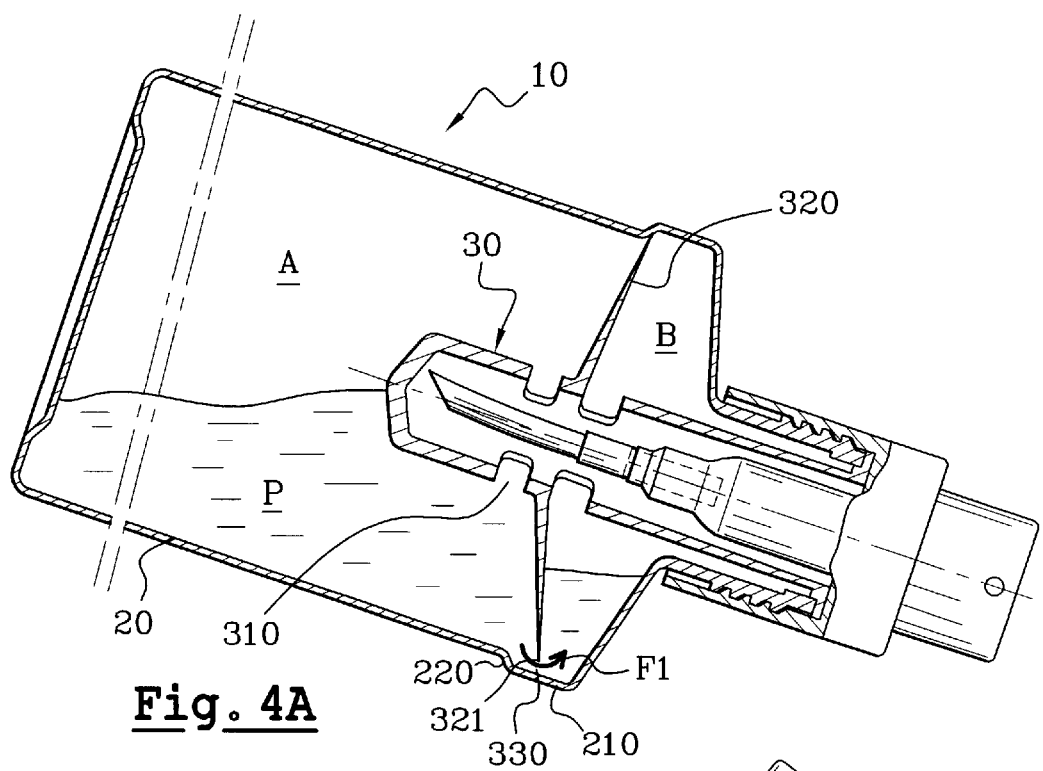
FIG. 4A is a sectional view of the device of FIG. 1A in a partly inverted position.
Figure 4B:
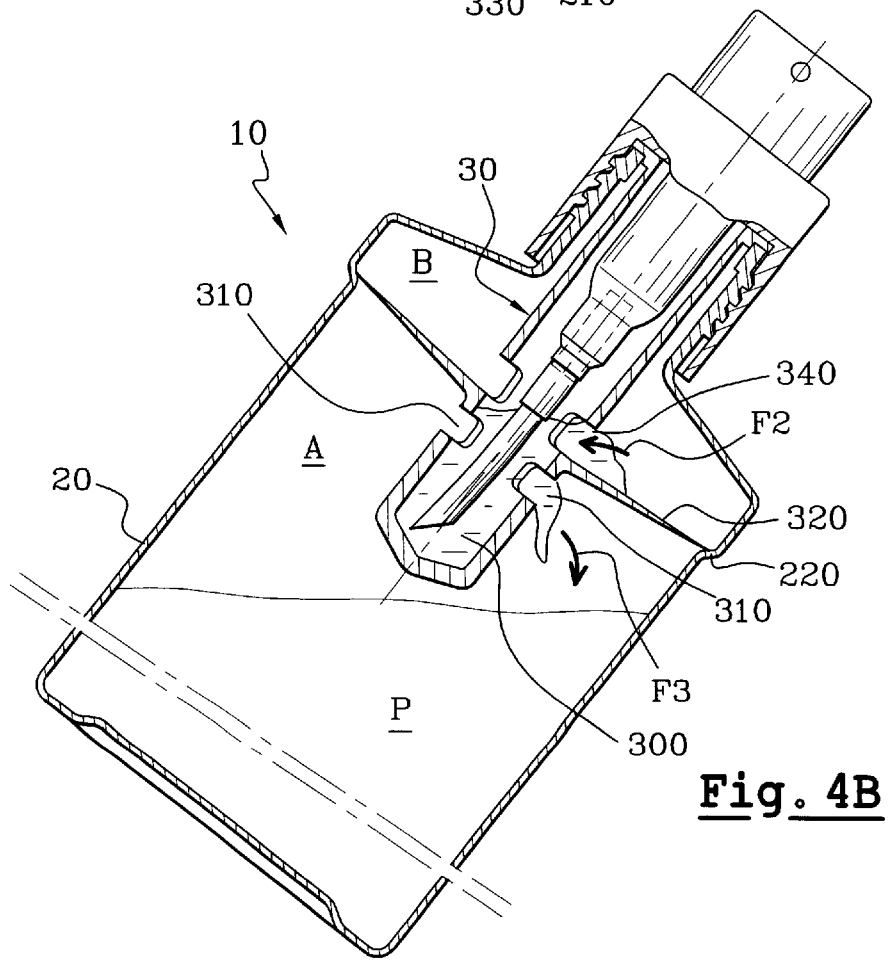
FIG. 4B is a sectional view of the device of FIG. 1A being returned to an upright position from an at least partly inverted position.
Figure 4C:
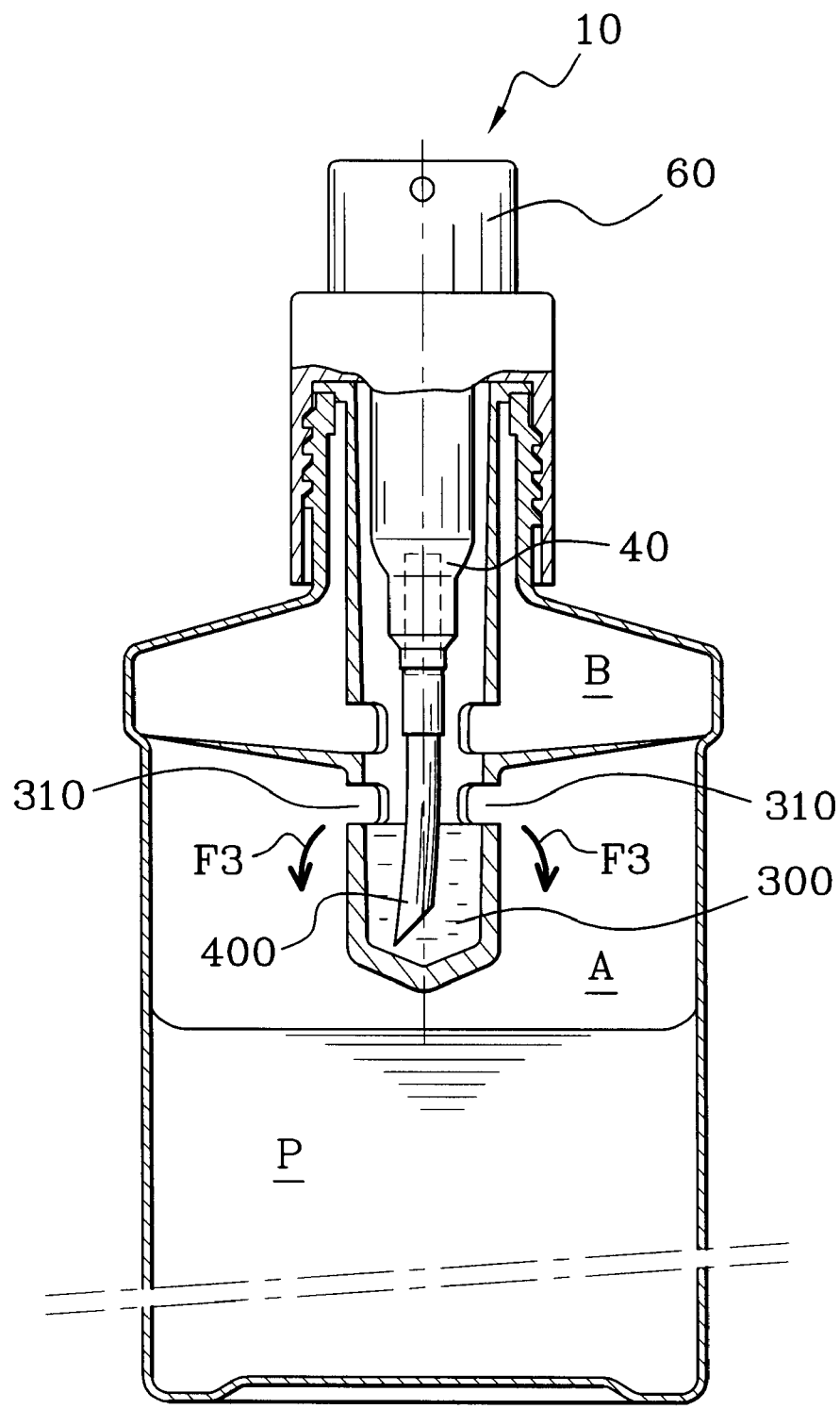
FIG. 4C is a sectional view of the device of FIG. 1A ready for use to dispense product from the cavity.

FIGS. 4A–4C, to which reference is now made, illustrate various stages in the operation of the dispensing device 10, which has just been described with reference to FIGS. 1A, 1B, 2 and 3A–3C.

In FIG. 4A, the device 10 is partially inverted to a head-down position so that the weight of the product P and the flexibility of the separation member 320 allow the latter to flex toward the opening 200 of the container 20. A passage 330 may thus be formed between the first region A and the second region B. The passage 330 may be defined by the peripheral edge 321 of the separation member 320 and the interior surface of wall 210 of the container 20. The product P may flow from the first region A into the second region B, as indicated by the arrow F1. If the remaining amount of product in the first region A is sufficient, some of the product P also may flow through the passages 310 in the retaining element 30. Part of the second region B may then fill with product P. This second region B may have dimensions such that its volume is significantly greater than that of the metering cavity 300.

When the device returns from the at least partly inverted position of FIG. 4A to the upright position of FIG. 4C, an intermediate position of which is depicted in FIG. 4B, the separation member 320 may return to its initial position under the combined effect of the weight of the product P in the second region B and of the flexibility of the separation member 320. The separation member 320 may then press on the shoulder 220 so that the passage 330 closes again to substantially seal the first region A from the second region B. The product P present in the second region B of the container 20 may now flow into the metering cavity 300 via the passages 340, as indicated by the arrow F2.

By continuing the movement so as to return the device 10 more or less to the upright position, as depicted in FIG. 4C, the product P may fill the metering cavity 300. Any excess product P in the metering cavity 300 may drop back into the first region A of the container 20 through overflowing via the passages 310, as indicated by the arrow F3. The metering cavity 300 may thus fill substantially the same way with virtually every use of the device, regardless of the conditions under which the container is inverted and returned to the upright position.

Next, substantially all of the product P contained in the metering cavity 300 may be dispensed via the pump 40. The pump 40 may be actuated by means of a push-button 60, for example. The product may pass into the pump 40 via the dip tube 400. In an exemplary embodiment, the free end of the dip tube 400 may be disposed proximate the bottom of the metering cavity 300.

As discussed, the dispensing device in an exemplary embodiment is intended for the dispensing of a cosmetic and/or care product. However, in its broadest aspects, the present invention could be used to dispense many other types of flowable substances. For example, various pharmaceuticals, polishes, and cleaning products may be dispensed using the devices disclosed herein. Furthermore, sizes of various structural parts and materials used to make these parts are illustrative and exemplary only and one of ordinary skill in the art would recognize that these materials and sizes can be changed as necessary to product different effects or desired characteristics of the dispensing assembly.

It will be apparent to those skilled in the art that various modifications and variations can be made to the structure and methodology. Thus, it should be understood that the invention is not limited to the examples discussed in the specification. Rather, the present invention is intended to cover modifications and variations.

What is claimed is:

1. A device for dispensing a product, the device comprising:
   a container defining an opening, the container being configured to contain a product;
   a retaining element mounted at least partially in the opening and defining a cavity configured to contain an amount of the product for dispensing;
   a separating member separating a first region of the container from a second region of the container, the first region being configured so that the product resides therein when the device is in an upright position and the second region being disposed adjacent the opening;
   at least one first passage defined by the retaining element, the at least one first passage having a position that defines a maximum amount of product capable of being contained in the cavity; and
   at least one second passage defined by the retaining element, the at least one second passage being in flow communication with the second region of the container and configured to permit passage of at least some product from the second region into the cavity,
   wherein the separating member is configured to permit one-way flow of product from the first region to the second region when the device is at least partially inverted from its upright position.

2. The device of claim 1, wherein at least one third passage is defined between the container and the separation member when the device is at least partially inverted, the third passage being configured to permit the flow of product from the first region to the second region.

3. The device of claim 1, wherein the separation member element slopes downward in a direction toward the second passage.

4. The device of claim 1, wherein the separation member comprises an elastically deformable diaphragm.

5. The device of claim 1, wherein the separation member defines a peripheral edge that extends substantially to an interior surface portion of the container.

6. The device of claim 5, wherein a portion of the separation member is configured to contact another interior surface portion of the container when the device is in an upright position and is configured to move away from the other interior surface portion when the device is at least partially inverted.

7. The device of claim 6, wherein the portion of the separation member is configured to move away from the other interior surface portion in response to pressure of the product.

8. The device of claim 6, wherein the portion of the separation member configured to come into contact with the other interior surface portion of the container is an annular portion radially separated from the peripheral edge of the separation member.

9. The device of claim 6, wherein the other interior surface portion is a shoulder defined by the container.

10. The device of claim 4, wherein the diaphragm is made of a material chosen from thermoplastic elastomers and crosslinked elastomers.

11. The device of claim 10, wherein the diaphragm is made of a material chosen from silicones, natural laftices, synthetic latices, EPDMs, polyurethanes, blends of polypropylene and SIBS, blends of polypropylene and SEBS, blends of polypropylene and EPDM, very-low-density polyethylenes, blends based on polyester glycols, blends based on polyether glycols, and flexible polyvinyl chlorides.

12. The device of claim 5, wherein the separation member has a thickness that decreases toward the peripheral edge.

13. The device of claim 1, wherein the separation member is inclined in a downward direction toward the retaining element.

14. The device of claim 13, wherein the separation member forms an angle ranging from approximately 60 degrees to approximately 90 degrees with a longitudinal axis of the device.

15. The device of claim 1, wherein the retaining element and the separation member are molded together as a single piece.

16. The device of claim 1, wherein the retaining element comprises a tubular member having a closed end defining a bottom of the cavity when the device is in an upright position and having an end opposite the closed end being mounted proximate an edge of the opening of the container.

17. The device of claim 16, wherein the end opposite the closed end defines an opening.

18. The device of claim 16, further comprising a pump associated with a dip tube, the dip tube extending to proximate the bottom of the cavity.

19. The device of claim 1, wherein the container comprises a neck portion and wherein the retaining element extends over at least part of its height within the neck portion.

20. The device of claim 19, wherein the neck portion comprises a free edge that defines the opening of the container.

21. The device of claim 19, further comprising a pump configured to be mounted in the neck portion.

22. The device of claim 21, further comprising a band configured to mount the pump in the neck portion, the band being configured to engage with the neck portion by one of snap-fastening and screw-fastening.

23. The device of claim 21, further comprising an actuation member for actuating the pump.

24. The device of claim 23, wherein the actuation member comprises a push-button.

25. The device of claim 1, wherein the separation member extends radially outward from the retaining element.

26. The device of claim 25, wherein the separation member is substantially planar.

27. The device of claim 25, wherein the separation member is a solid member.

28. The device of claim 1, wherein the at least one first passage and the at least one second passage are disposed on opposite sides of the separation member.

29. The device of claim 1, further comprising the product in the container.

30. The device of claim 29, wherein the product is chosen from a cosmetic product and a care product.

31. The device of claim 29, wherein the product is intended to be applied to at least one of skin, hair, fingernails, and toenails.

32. A method of dispensing a product, the method comprising:
providing the device of claim 1;
flowing product into the cavity; and
dispensing the product from the cavity.

33. The method of claim 32, wherein the dispensing of the product from the cavity comprises dispensing substantially all of the product within the cavity.

34. The method of claim 32, wherein the flowing of the product into the cavity comprises flowing the product into the cavity via the second passage.

35. The method of claim 34, wherein the flowing of the product into the cavity comprises flowing the product into the cavity via the first passage.

36. The method of claim 32, wherein the flowing of the product into the cavity comprises flowing product from the second region of the container through the second passage.

37. The method of claim 32, wherein the flowing of the product into the cavity comprises inverting the device.

38. The method of claim 37, further comprising forming a third passage between the first region and the second region.

39. The method of claim 38, further comprising flowing the product from the first region into the second region via the third passage.

40. The method of claim 33, further comprising flowing excess product out of the cavity via the first passage prior to dispensing the product from the cavity.

41. A dispensing head for dispensing product from a container, the dispensing head comprising:
a tubular member defining a cavity configured to contain an amount of product to be dispensed; and
a separation member extending radially from the tubular member and being configured to substantially separate a first region of the container from a second region of the container when the dispensing head is associated with the container and the container is in an upright position,
wherein the tubular member defines at least one first passage configured to permit flow of product therethrough and at least one second passage configured to permit flow of product therethrough, the at least one first passage and the at least one second passage being disposed on opposite sides of the separation member.

42. The dispensing head of claim 41, wherein the tubular member comprises a closed end defining a bottom of the cavity when the dispensing head is associated with the container and the container is in an upright position.

43. The dispensing head of claim 41, wherein the tubular member has an edge defining an opening configured to at least partially receive a dispensing mechanism.

44. The dispensing head of claim 43, further comprising the dispensing mechanism, wherein the dispensing mechanism comprises a pump.

45. The dispensing head of claim 44, wherein the dispensing mechanism further comprises a dip tube, the dip tube extending to proximate an end of the tubular member opposite the opening.

46. The dispensing head of claim 45, wherein the end of the tubular member opposite the opening is closed and defines a bottom of the cavity when the dispensing head is associated with the container and the container is in an upright position.

47. The dispensing head of claim 41, wherein the separation member comprises a diaphragm.

48. The dispensing head of claim 47, wherein the diaphragm is made of a flexible material.

49. The dispensing head of claim 48, wherein the diaphragm is made of a material chosen from thermoplastic elastomers and crosslinked elastomers.

50. The dispensing head of claim 49, wherein the diaphragm is made of a material chosen from silicones, natural lattices, synthetic latices, EPDMs, polyurethanes, blends of polypropylene and SIBS, blends of polypropylene and SEBS, blends of polypropylene and EPDM, very-low-density polyethylenes, blends based on polyester glycols, blends based on polyether glycols, and flexible polyvinyl chlorides.

51. The dispensing head of claim 41, wherein the separation member has a thickness that decreases toward a peripheral edge of the separation member.

52. The dispensing head of claim 41, wherein the separation member slopes downward in a direction toward the tubular member.

53. The dispensing head of claim 52, wherein the separation member forms an angle ranging from approximately 60 degrees to approximately 90 degrees with a longitudinal axis of the tubular member.

54. The dispensing head of claim 41, wherein the tubular member and the separation member are molded together as a single piece.

55. The dispensing head of claim 41, wherein at least a portion of the separation member is flexible.

56. The dispensing head of claim 55, wherein the separation member is configured to flex so as to permit product flow communication between the first region and the second region of the container when the dispensing head is associated with the container and the container is in an at least partially inverted position.

57. The dispensing head of claim 55, wherein at least the portion of the separation member is configured to pivot with respect to the tubular member in response to sufficient pressure acting on the separation member.

58. The dispensing head of claim 41, further comprising a band configured to engage with a neck portion of the container for mounting the dispensing head on the container.

59. The dispensing head of claim 58, wherein the band is configured to engage the neck portion via one of snap-fastening and screw-fastening.

60. The dispensing head of claim 41, wherein an annular region of the separation member is configured to contact an interior wall surface of the container when the dispensing head is associated with the container and the container is in an upright position.

61. The dispensing head of claim 60, wherein the annular region of the separation member is radially separated from a peripheral edge of the separation member.

62. The dispensing head of claim 60, wherein the annular region is configured to move out of contact with the interior wall surface of the container when the dispensing head is associated with the container and the container is in an at least partially inverted position.

63. The dispensing head of claim 41, further comprising a third passage defined at least partially by the separation member when the dispensing head is associated with the container and the container is in an at least partially inverted position, the third passage being configured to flow product from the first region to the second region.

64. The dispensing head of claim 41, wherein the separation member is substantially planar.

65. The dispensing head of claim 41, wherein the separation member is a solid member.

66. An assembly for dispensing a product, the assembly comprising:

a container configured to contain a product to be dispensed; and the dispensing head of claim 41 mounted on the container.

67. The assembly of claim 66, further comprising a product in the container.

68. The assembly of claim 67, wherein the product is chosen from a cosmetic product and a care product.

69. The assembly of claim 67, wherein the product is intended to be applied to at least one of skin, hair, fingernails, and toenails.

70. The assembly of claim 66, wherein the container comprises a neck portion and the dispensing head is mounted at least partially on the neck portion.

71. The assembly of claim 66, wherein the container comprises an internal shoulder against which the separation member is configured to abut when the container is in the upright position.

72. The assembly of claim 66, wherein the at least one first passage is in flow communication with the first region and the at least one second passage is in flow communication with the second region.

73. A method of dispensing a product, the method comprising:

providing the assembly of claim 66;

flowing product into the cavity; and dispensing the product from the cavity.

74. The method of claim 73, wherein the first region of the container is below the separation member and the second region of the container is above the separation member when the container is in an upright position.

75. The method of claim 73, wherein the dispensing of the product from the cavity comprises dispensing substantially all of the product within the cavity.

76. The method of claim 73, wherein the flowing of the product into the cavity comprises flowing the product into the cavity via the second passage.

77. The method of claim 76, wherein the flowing of the product into the cavity comprises flowing the product into the cavity via the first passage.

78. The method of claim 73, wherein the flowing of the product into the cavity comprises flowing product from the second region of the container through the second passage.

79. The method of claim 73, further comprising inverting the container.

80. The method of claim 79, further comprising forming a third passage between the first region and the second region.

81. The method of claim 80, further comprising flowing the product from the first region into the second region via the third passage.

82. The method of claim 73, further comprising flowing excess product out of the cavity via the first passage prior to dispensing the product from the cavity.

* * * * *

UNITED STATES PATENT AND TRADEMARK OFFICE
CERTIFICATE OF CORRECTION

PATENT NO. : 6,431,408 B1
DATED : August 13, 2002
INVENTOR(S) : Vicent De LaForcade It is certified that error appears in the above-identified patent and that said Letters Patent is hereby corrected as shown below:

Column 10,
Line 50, replace "laftices" with -- lattices --.

Signed and Sealed this

Fourteenth Day of January, 2003

JAMES E. ROGAN
*Director of the United States Patent and Trademark Office*